United States Patent [19]

Daniel

[11] Patent Number: 5,250,176
[45] Date of Patent: Oct. 5, 1993

[54] MODULAR VALVE ASSEMBLY FOR OIL FILTER

[75] Inventor: Dieter P. Daniel, Dillon, S.C.

[73] Assignee: Dana Corporation, Toledo, Ohio

[21] Appl. No.: 800,193

[22] Filed: Nov. 27, 1991

[51] Int. Cl.$^5$ ............................................. B01D 27/10
[52] U.S. Cl. ................... 210/130; 210/136; 210/430; 210/440
[58] Field of Search ............ 210/130, 133, 136, 430, 210/440, 444

[56] References Cited

U.S. PATENT DOCUMENTS

| | | | |
|---|---|---|---|
| 3,042,215 | 7/1962 | Gruner | 210/443 |
| 3,184,062 | 5/1965 | Humbert | 210/130 |
| 3,235,085 | 2/1966 | Humbert | 210/130 |
| 3,297,162 | 1/1967 | Mouwen | 210/132 |
| 3,315,809 | 4/1967 | Hultgren | 210/130 |
| 3,369,666 | 2/1968 | Hultgren | 210/130 |
| 3,370,708 | 2/1968 | Hultgren | 210/130 |
| 3,456,800 | 7/1969 | Humbert | 210/130 |
| 3,529,722 | 9/1970 | Humbert | 210/130 |
| 3,557,957 | 1/1971 | Baldwin | 210/130 |
| 3,599,792 | 8/1971 | Stripp | 210/130 |
| 3,662,893 | 5/1972 | Humbert | 210/315 |
| 3,785,491 | 1/1974 | Dudinec et al. | 210/130 |
| 3,807,561 | 4/1974 | Cullis | 210/130 |
| 3,912,630 | 10/1975 | Reighard et al. | 210/130 |
| 3,984,318 | 10/1976 | Bumb | 210/130 |
| 3,996,137 | 12/1976 | Cooper | 210/130 |
| 4,099,540 | 7/1978 | Papp | 137/493.8 |
| 4,127,484 | 11/1978 | Walulik et al. | 210/130 |
| 4,272,368 | 6/1981 | Foord et al. | 210/90 |
| 4,279,746 | 7/1981 | Leutz | 210/130 |
| 4,497,706 | 2/1985 | Pickett et al. | 210/130 |
| 4,500,425 | 2/1985 | Thornton et al. | 210/136 |
| 4,764,275 | 8/1988 | Robichaud | 210/232 |
| 4,820,409 | 4/1989 | Lowsky et al. | 210/130 |
| 4,935,127 | 6/1990 | Lowsky et al. | 210/130 |

Primary Examiner—Matthew O. Savage
Attorney, Agent, or Firm—F. B. McDonald

[57] ABSTRACT

A modular compound valve assembly for an automotive oil filter includes a relief valve subassembly and a clean-side anti-drainback valve subassembly sharing a common unitary valve body. In one preferred form, the valve body is formed of a stepped cylinder, wherein axially opposed surfaces of a first step comprise respective seats for first and second springs utilized in the two valve subassemblies. The first spring (for the relief valve) is entirely contained within the valve body, while the second spring (for the anti-drainback valve) is external to the valve body although supported thereon. The second spring is a frustoconically-shaped spring biased between the first step of the valve body and an external circular disc spaced from but fixed to a plunger of the anti-drainback valve. To the extent that the anti-drainback plunger is adapted for being seated within the valve body, the compound valve assembly offers greater flexibility in stocking inventories of valve subassemblies for in-field selection and modification. For example, the anti-drainback valve subassembly may be "piggybacked" onto the relief valve subassembly without requirement of special tools. Finally, in the same preferred form, the anti-drainback subassembly includes a pair of struts fixed to the circular disc, wherein the second spring is maintained under constant compression between the disc and step of the valve body to close the anti-drainback plunger, and hence to avoid leakage of clean oil from the filter, upon shutdown of an associated engine.

8 Claims, 2 Drawing Sheets

MODULAR VALVE ASSEMBLY FOR OIL FILTER

BACKGROUND OF THE INVENTION

This invention relates to oil filter assemblies. More particularly, this invention relates to modular relief valve and anti-drainback valve subassemblies of the type utilized in oil filters for automotive engines.

As there are a variety of filter requirements for meeting various automotive engine specifications, there are also numerous valve requirements for various automotive filters. In some heavy duty applications, it has been customary to utilize clean-side as well as dirty-side anti-drainback valves in conjunction with typical oil pressure relief valves employed in most applications. Most often, the dirty-side anti-drainback valve and relief valve structures are entirely separate, although arranged in close proximity to each other. However, when employed, clean-side anti-drainback valves have typically been manufactured as mechanically integral parts of the relief valve structures; hence, modular assembly or disassembly of the typical combined relief valve and clean-side valve structures has not been feasible. To the extent that modular units of such valves could be formed or constructed as "subassemblies", a resultant benefit would be greater inventory flexibility. Thus, relief valve modules would normally be installed within each originally manufactured automotive filter, while modular clean-side anti-drainback units could be conveniently subsequently installed, as or if required, without necessity of stocking compound or dual valve units as such.

SUMMARY OF THE INVENTION

A compound valve assembly for an oil filter includes modular relief valve and clean-side anti-drainback valve subassemblies conveniently sharing a unitary valve body. In a preferred form, the valve body is defined by a stepped cylinder wherein a first step provides opposed seats for anti-drainback valve and relief valve springs, each of which is axially oriented in an end-to-end relationship with respect to the other. The valve body entirely contains the relief valve spring, while the anti-drainback valve spring is supported on a pair of spring seats exterior to the valve body, one seat being formed on a circular disc spaced from but rigidly affixed to an anti-drainback valve plunger. A frustoconical spring normally holds the plunger against an associated plunger seat in the valve body, the small end of the spring engaging the circular disc, the larger end supported on an exterior spring seat comprising an exterior surface of the valve body located circumferentially about the plunger seat. Thus, though the unitary valve body readily lends itself to oil filter assemblies containing only relief valves, it is equally suited to accommodate an anti-drainback valve module in combination with a relief valve.

DETAILED DESCRIPTION OF A PREFERRED EMBODIMENT

Figure 1:
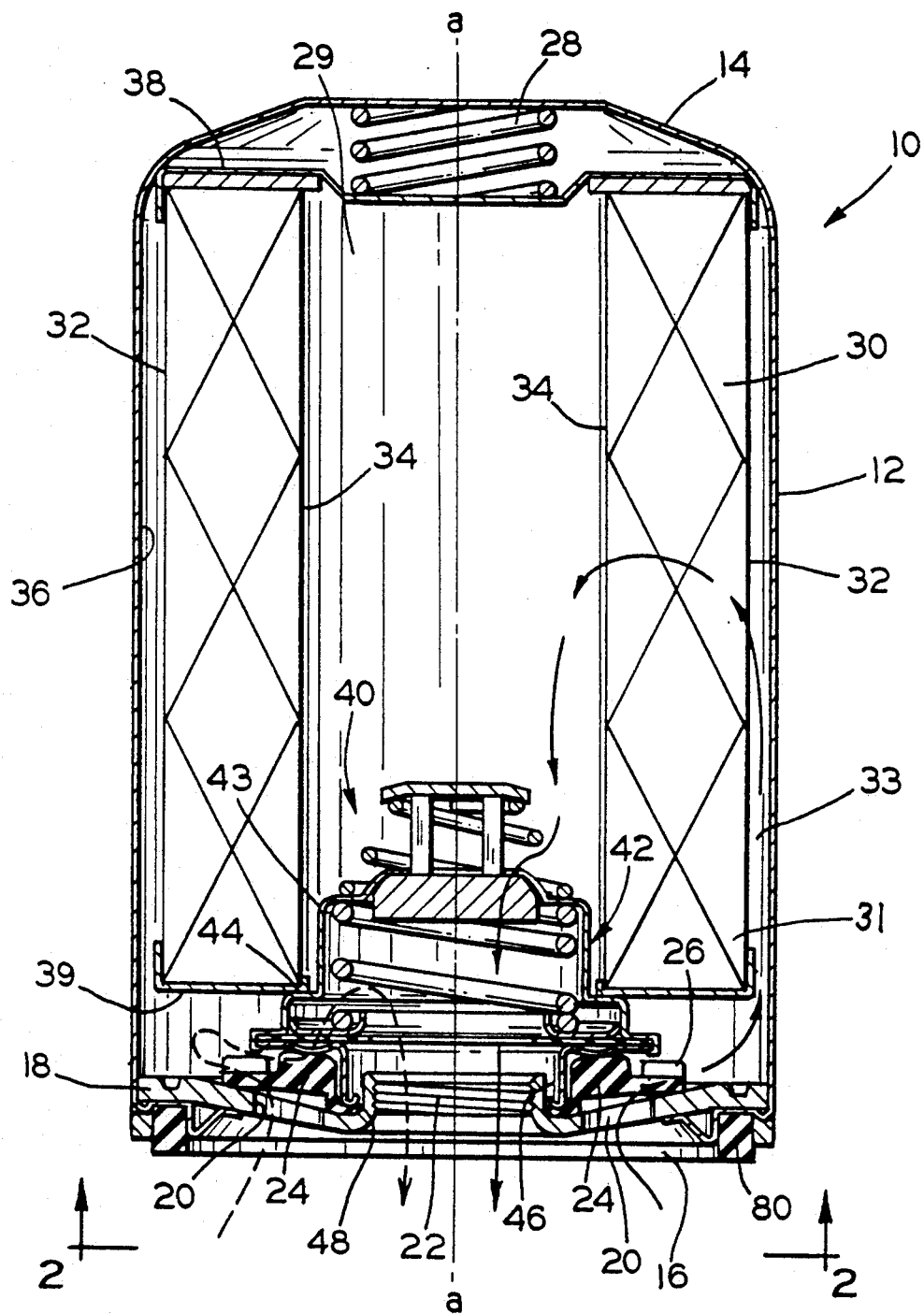
FIG. 1 is a cross-sectional elevation of an oil filter assembly which includes compound modular valve sub-assemblies constructed in accordance with the present invention.
Figure 2:
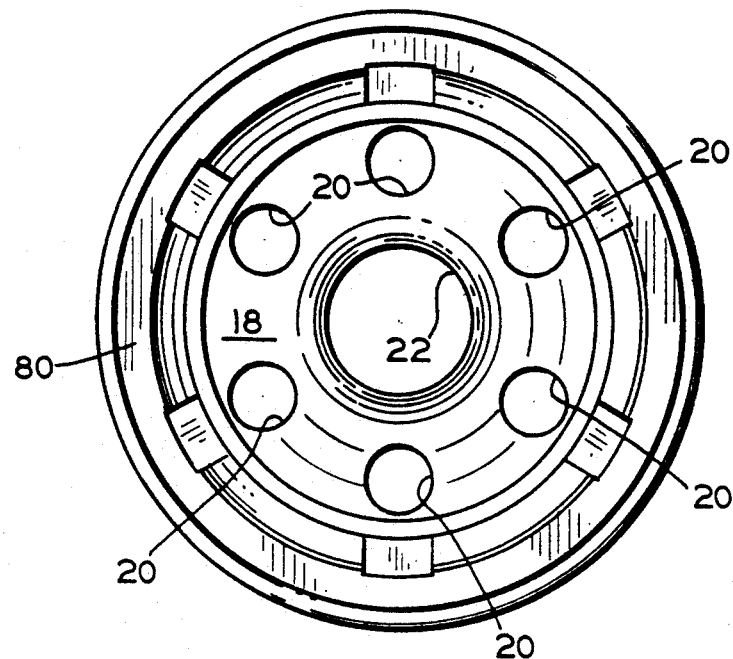
FIG. 2 is an end view of a closure plate member along lines 2—2 of FIG. 1.

Referring initially to FIGS. 1 and 2, an automotive oil filter 10 has a symmetrical, cup-shaped exterior body or shell 12 oriented along a central axis "a—a". The shell includes a closed end 14, as well as an opposed open end 16. The open end rigidly supports a separate closure plate 18 (see also FIG. 2) which includes entry apertures 20 for dirty oil, the oil being drawn by a pump (not shown) from the sump of an internal combustion engine (not shown). A single passage internally threaded exit aperture 22 is centrally disposed along axis "a—a" for discharge of filtered, clean oil through a centertube (not shown) and to the oil galleries of an internal combustion engine, as will be appreciated by those skilled in the art.

The normal entry and exist flow path of oil is shown by solid arrows through the filter assembly 10 in the right-side of FIG. 1 (right of axis "a—a"). The normal oil flow pattern is, of course, three-dimensional and is actually an annular flow pattern. The dirty oil flows from the apertures 20 through a dirty-side anti-drainback valve 24 of a traditional elastomeric flap-type structure, which includes typical radial spacer ribs 26. Upon passage through the dirty-side anti-drainback valve 24, the dirty or "unfiltered" oil passes through the annular space 33 between the circumferential exterior 32 of a cylindrical filter element 30 and the circumferential interior wall 36 of the cylindrical shell 12. Upon becoming "filtered", the oil passes through the circumferential interior surface wall 34 of the filter 30, for passage through a compound valve assembly 40 situated and supported within the interior opening 29 of and at one end 31 of the annular filter element 30. The filter element 30 is supported within the shell 12 via its axial ends or extremities which are defined by a circular filter end cap 38 and an annular filter end cap 39, piloted on a pressure spring 28 and a stepped cylindrical valve body 42, respectively. The pressure spring 28 is disposed between the end cap 38 and the closed end 14 of the shell, while a radially extending annular lip or step 44 formed on the valve body 42 is adapted to support the end cap 39. The pressure spring 28 applies sufficient force to seat the support or base flange 46 (FIG. 3) of the valve body 42 against an inner periphery 48 of the dirty-side anti-drainback valve 24 to form a sealing engagement therewith against the closure plate 18.

Figure 3:
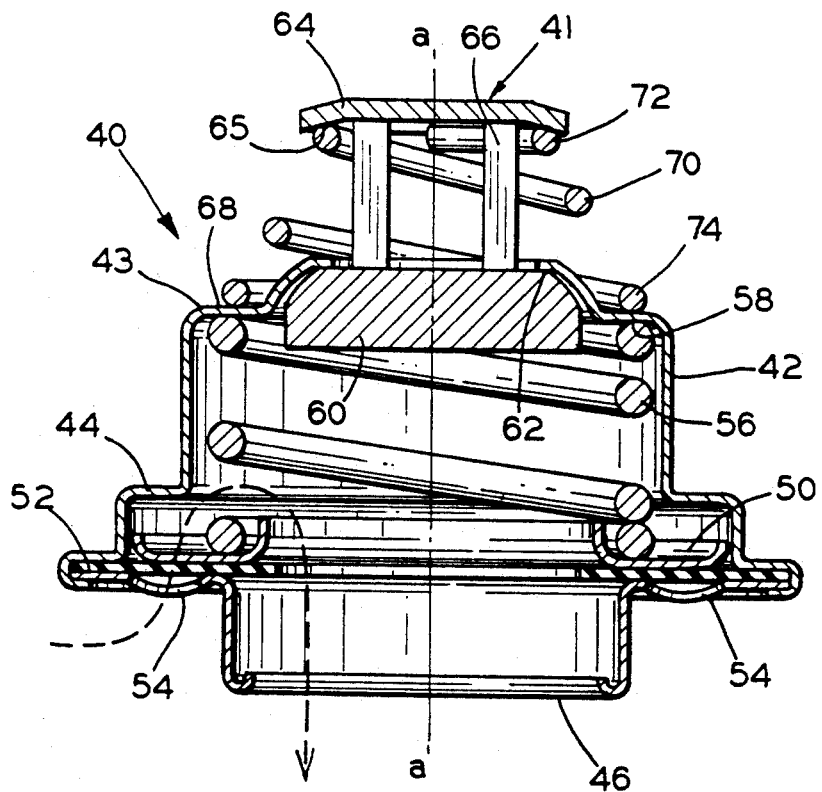
FIG. 3 is a separate cross-sectional view of the compound modular valve assembly of the present invention.

Referring now particularly to FIG. 3, the modular valve assembly 40 incorporates a valve body 42 designed to accommodate both relief valve and clean-side anti-drainback valve subassemblies. The relief valve subassembly is formed of a relief valve plunger 50 adapted to be normally in constant spring-biased engagement with a relief valve plunger seat 52. The plunger seat 52 includes a series of apertures 54, the seat 52 defining an annulus rigidly affixed to the body 42 by welding or crimping. A relief valve spring 56 is piloted against a relief valve seat 58 formed in a first step 43 of the stepped cylindrical valve body 42, as shown. The spring 56 extends between the seat 58 and the relief valve plunger 50 to normally bias against and tightly close the plunger 50 against the apertures 54 to normally prevent leakage of oil directly through the relief valve (to thereby normally avoid the "relief" flow shown by dotted arrows left of center lines "a—a" in FIGS. 1 and 3). As a safety precaution against starving the engine of oil, if the filter element 30 becomes clogged, the oil will be forced to travel (referring to said dotted arrows of FIG. 1) through the inlet apertures 20 of the closure plate 18, through the dirty-side anti-drainback valve 24, and then directly through the apertures 54. In case of clogged filter, inlet oil pressure will be sufficiently high to raise the relief valve plunger 50 from the plunger seat 52, and allow oil to exit directly from apertures 54 through the threaded exit aperture 22 of the closure plate 18, thereby bypassing the filter element 30.

The clean-side anti-drainback valve subassembly 41 (FIG. 3) is normally held open by oil pressure during engine operation, becoming closed upon shutdown of the engine. Thus the upper subassembly portion 41 of the valve assembly 40 includes an anti-drainback valve plunger 60 which engages an anti-drainback valve plunger seat 62 formed radially inwardly of the relief valve spring seat 58, both internal to the valve body 42. An external circular disc 64 includes an anti-drainback valve spring seat 65 which axially faces the anti-drainback valve plunger 60, though spaced therefrom. The plunger 60 and disc 64 are permanently and rigidly coupled together by a pair of struts 66 in the preferred embodiment, although only one strut may be employed. An anti-drainback spring 70, formed preferably as a frustoconical member, has its smallest diameter end 72 in engagement with the seat surface 65 of the disc 64, and its larger diameter end 74 supported on a seat 68 situated on an exterior surface of the valve body 42. Those skilled in the art will appreciate that the respective spring support seats 58 and 68 are formed on opposed sides of the same step 43 of the valve body 42. The relative compressive spring forces of the relief valve spring 56 and the anti-drainback valve spring 70 are such that the force of the relief spring is much greater, as will be appreciated by those skilled in the art.

Finally, those skilled in the art will also appreciate that an annular rubber gasket 80 is rigidly affixed to the closure plate 18 for sealing against an engine oil plate after the internally threaded clean oil aperture 22 has been screwed onto a threaded centertube of an engine oil discharge passage (neither shown).

Although only one preferred embodiment has been detailed and described herein, the following claims are envisioned to cover numerous embodiments which may fall within their spirit and scope.

What is claimed is:

1. In an oil filter assembly including a cup-shaped shell defining a first closed end and a second open end spaced along an axis from said first end, said second open end adapted for entry and exit of oil through selective apertures, said assembly further comprising a cylindrical filter element having first and second ends supported between said first closed end and second open end of said shell, respectively, said assembly also including a unitary valve body supported at said second open end of said filter element for accommodating oil flow through said filter, said valve body being cup-shaped and defining an internal space within the internal boundaries of said body, said body containing a relief valve subassembly in its internal space; an improvement comprising: a clean-side anti-drainback valve subassembly supported on said valve body and situated adjacent said relief valve subassembly and within said filter element, wherein said relief valve comprises a first spring contained and supported internally of said valve body, while said clean-side anti-drainback valve includes a second spring external to and supported on an exterior surface of said valve body, each spring disposed in an axially oriented end-to-end relationship with respect to the other, wherein said relief valve subassembly and said clean-side anti-drainback valve subassembly together comprise a compound modular valve assembly for said oil filter, said relief valve subassambly further comprising an internal relief valve spring seat within said body of said valve and a first plunger seat situated within said valve body adjacent said second open end of said shell, said first plunger seat including apertures, said first plunger seat spaced from said relief valve spring seat, said relief valve subassembly further including a first plunger adjacent said first plunger seat, said first spring being in engagement with said first plunger to bias said first plunger against said first plunger seat, wherein said first spring extends and is disposed between said internal relief valve spring seat and said first plunger under a permanent compressive force, whereby said apertures are normally closed by said first plunger under said compressive force, wherein said anti-drainback valve subassembly comprises a second plunger and a second plunger seat fixed internally of said valve body, said second seat diametrically opposed to and axially spaced from said first plunger seat, said second plunger seat being adapted for interface with said second plunger, said anti-drainback valve subassembly comprising said second spring wherein said second spring is an anti-drainback spring, a first anti-drainback spring seat supporting said spring, said first spring seat defined by an exterior surface of said valve body, a second anti-drainback spring seat external to and spaced from said valve body, said second seat normally biased away from said valve body by said anti-drainback spring to retain said anti-drainback plunger in a closed position against said second plunger seat, wherein said anti-drainback valve further comprises means for rigidly fixing said second anti-drainback valve spring seat to said second plunger in a permanent axially spaced relationship with respect to said second plunger.

2. The oil filter assembly of claim 1 wherein said means for rigidly fixing said second anti-drainback valve spring seat to said second plunger in a permanent and axially spaced relationship comprises at least one elongated strut.

3. The oil filter assembly of claim 2 wherein said unitary valve body comprises a stepped cylindrical member containing said first spring, wherein said internal relief valve spring seat comprises an interior portion of a first step of said valve body, said first spring seat of said anti-drainback valve subassembly comprises an exterior surface on said first step of said cylindrical valve body, wherein said first and second springs bear respectively on opposed surfaces of said first step of said valve body.

4. The oil filter assembly of claim 3 wherein said first spring defines a first compressive force normally urging said first plunger against said first plunger seat, and wherein said second spring defines a second compressive spring force normally urging said second plunger against said second plunger seat, wherein said second compressive force is smaller than said first compressive force of said first spring.

5. The oil filter assembly of claim 4 wherein said first and second springs comprise coil springs seated on said opposed surfaces of said first step of said cylindrical valve body.

6. The oil filter assembly of claim 5 further comprising a circular disc external to said valve body and wherein said second spring seat of said anti-drainback valve comprises a radial surface on said circular disc, said strut being affixed to and extending axially inwardly of said second spring seat, said second spring being disposed under compression between said circular disc and said first step of said cylindrical valve body.

7. The oil filter assembly of claim 6 wherein said second valve spring comprises a frustoconically shaped spring body defining its smaller diameter end in contact with said second spring seat of said circular disc and its larger diameter end in contact with said first step of said valve body.

8. The oil filter assembly of claim 7 wherein there are at least two of said struts for fixing said circular disc to said second plunger.

* * * * *